(12) United States Patent
Keller et al.

(10) Patent No.: US 8,514,949 B1
(45) Date of Patent: Aug. 20, 2013

(54) SYNCHRONOUS, MULTI-STREAM DECODER

(75) Inventors: Rainer Keller, Mountain View, CA (US); Rainer Brodersen, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1217 days.

(21) Appl. No.: 10/642,429

(22) Filed: Aug. 14, 2003

(51) Int. Cl.
*H04N 7/12* (2006.01)

(52) U.S. Cl.
USPC ............. 375/240.28; 375/240.25; 348/388.1; 348/721

(58) Field of Classification Search
USPC .................................................. 386/66, 124
See application file for complete search history.

(56) References Cited

U.S. PATENT DOCUMENTS

| | | | | |
|---|---|---|---|---|
| 5,381,145 A * | 1/1995 | Allen et al. | .................... | 341/107 |
| 5,493,548 A * | 2/1996 | Kamioka | ...................... | 386/222 |
| 5,510,842 A * | 4/1996 | Phillips et al. | ........... | 375/240.25 |
| 5,598,352 A * | 1/1997 | Rosenau et al. | .............. | 715/203 |
| 5,883,671 A * | 3/1999 | Keng et al. | ................. | 375/240.1 |
| 6,396,874 B1 * | 5/2002 | Kato | ......................... | 375/240.16 |
| 6,594,444 B2 * | 7/2003 | Lee | ................. | 386/329 |
| 6,862,278 B1 * | 3/2005 | Chang et al. | .................. | 370/389 |
| 2001/0033620 A1 * | 10/2001 | Itokawa | .................... | 375/240.28 |
| 2002/0009149 A1 * | 1/2002 | Rodriguez et al. | ........ | 375/240.25 |
| 2002/0154823 A1 * | 10/2002 | Okada | .......................... | 382/233 |
| 2003/0113096 A1 * | 6/2003 | Taira et al. | ...................... | 386/46 |
| 2003/0138045 A1 * | 7/2003 | Murdock et al. | ......... | 375/240.12 |
| 2003/0161395 A1 * | 8/2003 | Byers | ....................... | 375/240.01 |

* cited by examiner

*Primary Examiner* — Christopher S Kelley
*Assistant Examiner* — Christopher Findley
(74) *Attorney, Agent, or Firm* — Kenyon & Kenyon LLP (57) ABSTRACT

A synchronous, multi-stream decoder provides synchronous playback of multiple streams of encoded digital data (e.g., MPEG streams) for use with, for example, a digital video streaming tool. The decoder includes a parser and decoder for each stream and a decoder engine for determining a target time for the decoders to complete their respective decoding processes. A next target time is preferably computed during a pause of the parsers after a current target time has been reached. In one embodiment, a next target time is computed by computing an average of the differences of stored playback times of the last N decoded frame sets.

23 Claims, 4 Drawing Sheets

SYNCHRONOUS, MULTI-STREAM DECODER

FIELD OF THE INVENTION

The invention relates generally to digital video streaming tools and, more particularly, to a multi-stream decoder for synchronous playback of encoded digital data (e.g., MPEG).

BACKGROUND OF THE INVENTION

Since the advent of Digital Video (DV) technology and high-quality DV camcorders there has been a continuing need for professional DV authoring tools. Various software packages, such as Apple Corporation's DVD STUDIO PRO™, include a suite of authoring tools and features that make Digital Video Disc (DVD) authoring relatively simple for video production companies, independent filmmakers, multimedia producers and the like. Users can shoot and edit video using a digital camcorder and an editing tool (e.g., Apple's Final Cut Pro™) to create the look and feel of menus, buttons and other embellishments. The video and audio are then organized into Titles, Chapters and Menus, encoded into formats required for DVD (i.e., MPEG-2, PCM, Dolby™ Digital Format) and burned to a DVD or written to other media that is sent to replication facilities.

DVD authoring tools typically run on high-end computer systems (e.g., Apple Power Mac G4) and provide an environment where DVD projects can be created and refined using built-in preview functions that enable the user to see how various links, menus, buttons and other embellishments integrate through the video in real time. Once the project is complete, the DVD can be burned to disc using an internal or external DVD-R drive or it can be sent to a service bureau or replication facility to write it to disc.

During project development, and particularly during the design of a DVD menu, an author will typically have various MPEG assets to represent chapters or one large MPEG asset for a whole title with embedded chapter markers. The author can choose a predefined template giving a layout or can define areas where chapter previews will play on a background. While experimenting with a layout (e.g., button positions, backgrounds, shapes for buttons, etc.), it is desirable to preview immediately after changes to gain an impression of how the playing DVD menu will look and feel on final disc. For inputs streams like DV or other QuickTime™ formats the ability to make and preview changes is a common process. If the source material, however, is already MPEG encoded (which is fairly typical in a DVD authoring environment), such functionality is more difficult to achieve because MPEG employs interframe compression techniques that do not permit most frames in a stream to be decoded independently of other frames. Moreover, MPEG streams vary in bit rate (e.g., 3-8 MBit/s, with variable bit rate being common), motion (which differs among scenes), picture structure (e.g., field encoded vs. frame encoded), resolution (e.g., MPEG1, cropped D1, half D1, 720×480/NTSC, 720×576/Pal, etc.) and frame rate (e.g., standard video frame rate vs. inverse telecined material).

The amount of processing power needed to decode each of the MPEG streams is also varying over time, with motion being the factor that influences processing power during different parts of the playback the most and VBR being second. Thus, decoding of multiple MPEG streams to provide synchronous playback of digital data provides additional challenges not addressed by conventional decoders.

For example, a DVD menu with six buttons typically requires the decoding of six video streams, i.e., one stream per button (assuming each button includes a video stream). If the background also presents a video stream, then the seventh stream needs decoding as well. When the menu screen is shown, it is expected that the motion in each of the six buttons will be played back in real time. Unfortunately, hardware limitations often dictate how many streams a given machine can decode completely in real time. Moreover, once the limit of processing is reached it is still desirable to preview the DVD menu, even if a preview is imperfect. As a compromise, some frames in MPEG streams are skipped causing the playback to stutter, but allows real-time playback of the MPEG clips to continue. A problem with skipping frames in multiple video streams is that if frames are skipped in some video streams but not others, the stream will fall out of sync with one another. One solution is to drop the same frames in all streams. Alternatively, frames that are close to each other in time between video streams can be dropped. However, in conventional systems, there is no mechanism for MPEG decoders working on various video streams to communicate with one another so that such frame-dropping can be coordinated. Regardless of how frames are dropped, when the interdependence of MPEG frames and other factors (e.g., bit rate, motion, resolution, frame rate, etc.) are taken into account the real time playback of an entire DVD menu with multiple streams is a complex process.

Accordingly, there is a need for a multi-stream decoder that can provide synchronous playback of digital data at a full or substantially full frame rate with low jitter, including digital data that has been compressed using interframe compression schemes (e.g., MPEG). The decoder should maximize the processing power of the host machine but still enable the user to perform editing tasks, such as selecting menus, moving windows, etc. In addition to digital video streams, at least one audio stream should be played back in sync with at least one video stream.

SUMMARY OF THE INVENTION

The present invention overcomes the deficiencies of the prior art by providing a synchronous, multi-stream decoder for providing synchronous playback of multiple streams of encoded digital data (e.g., MPEG streams) for use with, for example, a digital video streaming tool. In one embodiment of the present invention, a decoder for synchronous playback of multiple streams of encoded digital data comprises a plurality of parsers for parsing the multiple streams of encoded digital data; a plurality of decoders for decoding the parsed multiple streams of encoded digital data based on information provided by the parsers; and a decoder engine for determining a next target time for the decoders to complete their respective decoding processes prior to their display, wherein the target time is computed during a pause of the parsers after a current target time has been reached. After the next target time is determined, the parsers are resumed. The next target time can be determined from previous playback times.

In one embodiment, parsing and decoding are performed by parsing and decoding threads, respectively, and the parsing threads are processed before the decoding threads. Also, the number of decoders can be equal to the number of processors in the system.

DETAILED DESCRIPTION OF THE PREFERRED EMBODIMENTS

Multistream Decoder Architecture

Figure 1:
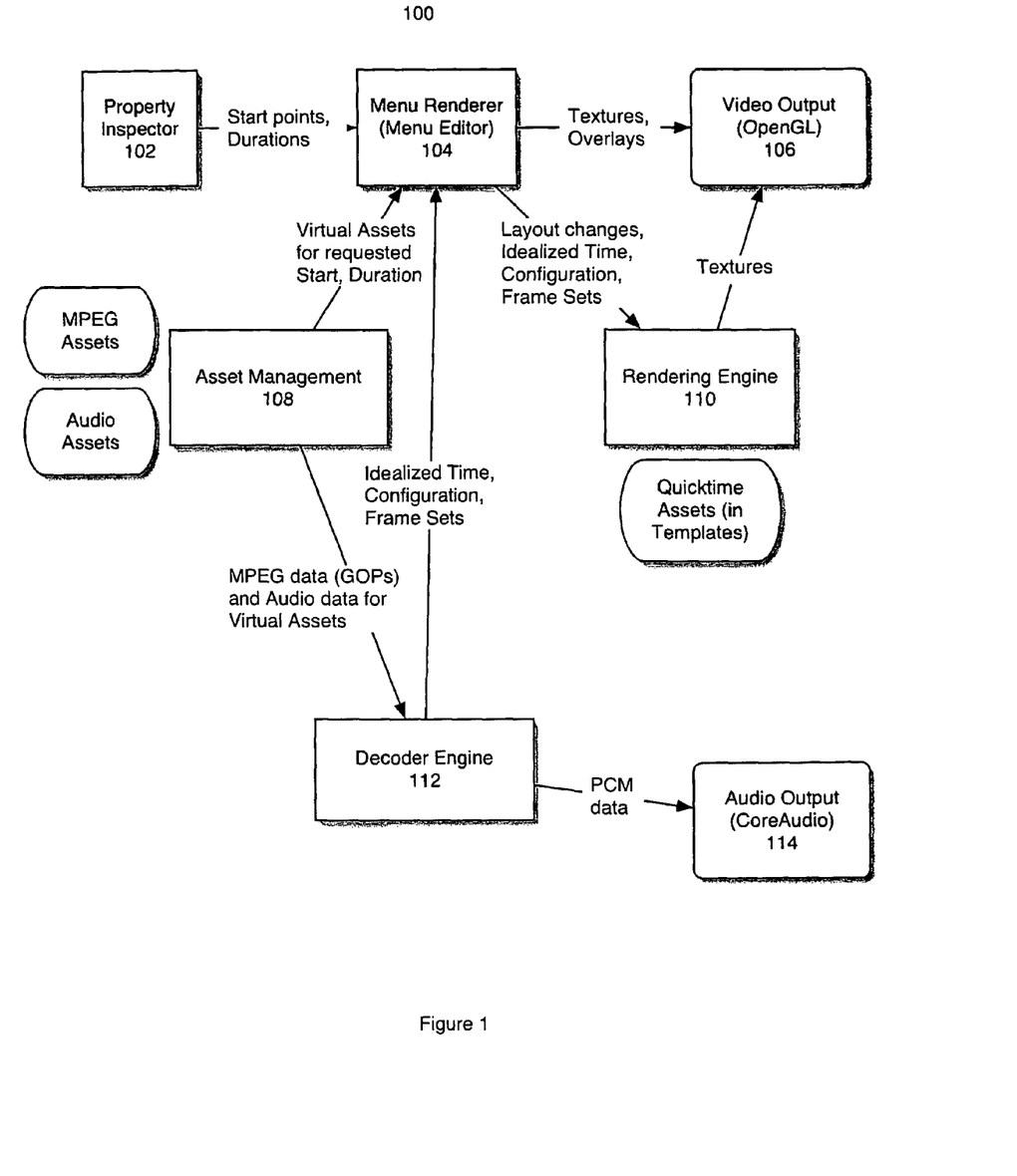
FIG. 1 is block diagram of a synchronous, multi-stream digital video decoder, in accordance with one embodiment of the present invention.

FIG. 1 is a block diagram of a synchronous, multi-stream decoder 100, in accordance with one embodiment of the present invention. The decoder 100 is preferably implemented in software stored on a computer-readable medium, which is executed by one or more processors in a computer system (e.g., Apple Mac G4). The multi-stream decoder 100 comprises several interoperable software subsystems, including a Menu Renderer (Menu Editor) 104, a Rendering Engine 110, a Property Inspector 102, an Asset Manager 108, and a Decoder Engine 112.

While the present invention is described with respect to MPEG bit streams, the present invention can be extended to any compression scheme that uses parsing. For purposes of describing the invention herein, it is assumed that the reader is familiar with the publicly available MPEG compression standards, and particularly MPEG decoders.

The Menu Renderer 104 and the Property Inspector 102 provide a User Interface (UI) for enabling the user to arrange multiple MPEG streams in a menu format. The Menu Renderer 104 provides textures and overlays to a Video Output 106 (e.g., OpenGL) for displaying the menu. The Rendering Engine 110 provides textures to the Video Output 106 and includes, for example QuickTime™ assets in template form. The Rendering Engine 110 receives frame sets and layout changes from the Menu Renderer 104. It also receives an Idealized Timestamp from the Menu Renderer 104, which will be described more fully below.

One example of a menu format is a Chapter Selection Menu format found on many commercially available DVDs. A typical menu format includes a background (possibly a movie) with one or more buttons for jumping to chapters on the main DVD title. The menu is created using the DVD authoring tool, including a playback display that enables the DVD author to assign several MPEG assets to chapter previews or one MPEG asset to a whole DVD title with embedded chapter markers. Using the DVD authoring tool, an author can select a template from a template library having a desired layout, or alternatively, the author can define areas where chapter previews will play on a background. The authoring tool enables the author to experiment with different layouts (e.g., button positions, backgrounds, shapes for buttons, etc.) and to preview the layouts immediately after every change to get an impression on how the playing menu will look when viewed on final disc.

Figure 2:
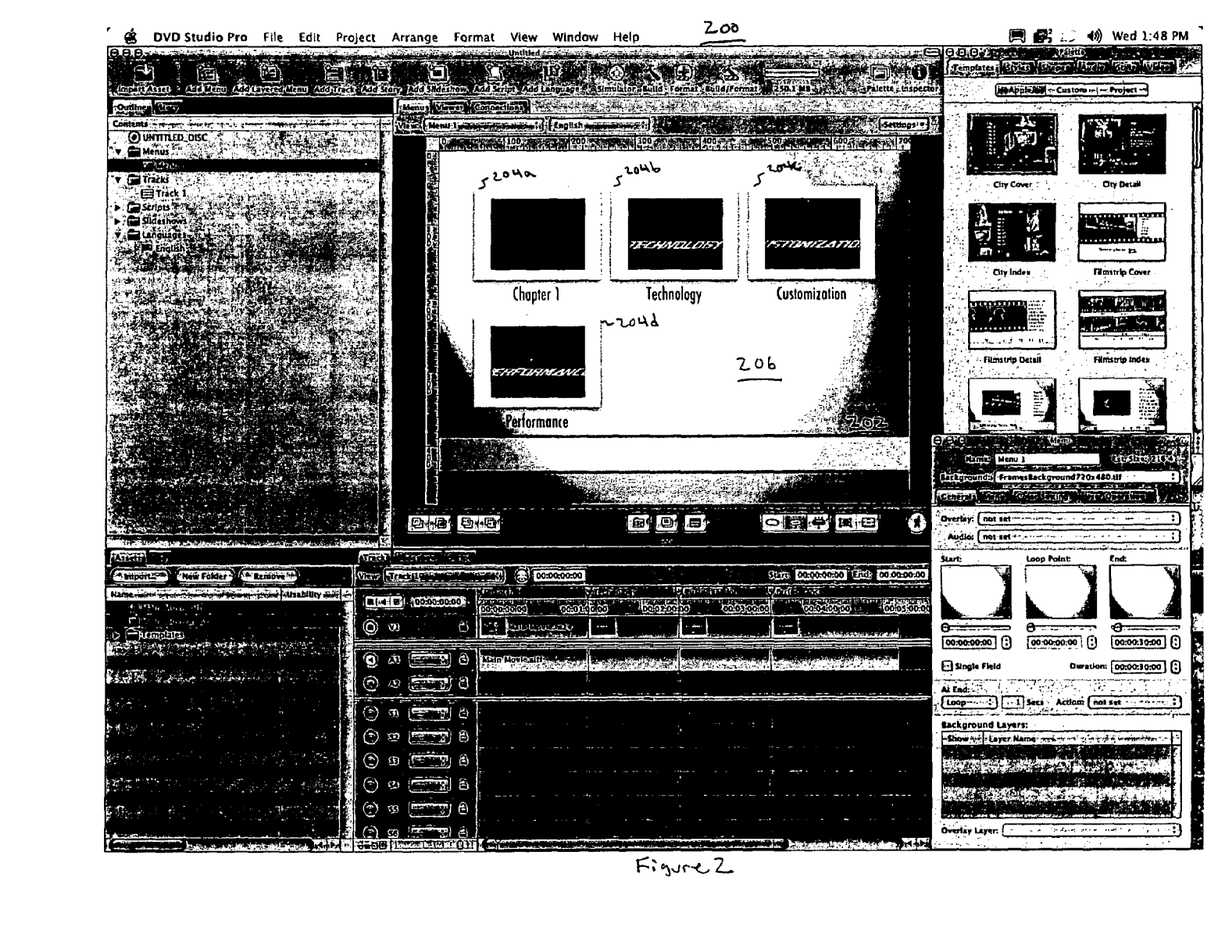
FIG. 2 is a screen shot of a playback display for digital video authoring tool, in accordance with one embodiment of the present invention.

FIG. 2 is a screen shot of a DVD authoring tool 200 with playback display 202, in accordance with one embodiment of the present invention. The playback display 202 includes four buttons 204a . . . 204d, for playing back chapter previews over a background 206. Each button 204a . . . 204d is associated with a particular MPEG asset, which plays back in real time in response to selection by the author.

The Asset Manager 108 maintains information about the structure of the MPEG and Audio assets. For example, it knows which parts of an MPEG asset forms self-contained units so that a group-of-pictures (GOP) in a unit, or a section consisting of several units, can be displayed independently of the rest of the MPEG asset. The Asset Manager 108 also knows for any given section in an MPEG stream which units are needed to playback a section and the relative time in the MPEG asset where the boundaries of those units are located. The Asset Manager 108 enables the Menu Renderer 104 to specify a start points and durations in the MPEG asset, thus allowing playback to start at, for example, a chapter marker.

Figure 3:
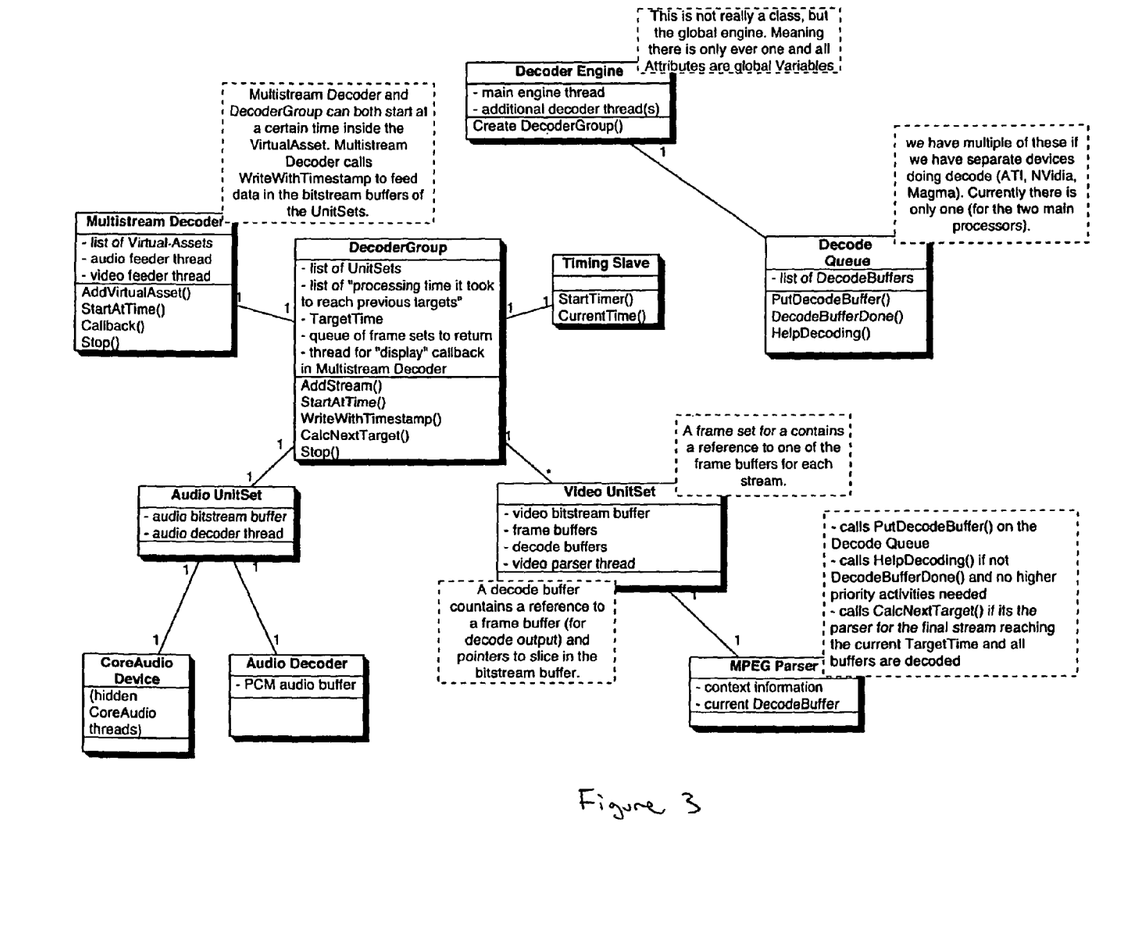
FIG. 3 is a block diagram showing class hierarchies of the multi-stream video decoder, in accordance with one embodiment of the present invention.

MPEG decoders for single streams are well known and publicly available in proprietary and open source formats. However, to solve a problem like synchronous, real time playback of multiple MPEG streams, the MPEG decoder 100 stores state information during streaming (e.g., in stream specific structures or objects), so that multiple decoders can be run independently of each other and simultaneously. Additionally, the decoder 100 stores information indicative of sets of streams that belong together based on one or more common attributes. In one embodiment, a MultistreamDecoder software class at the Asset Manager 108 level creates a DecoderGroup class in the Decoder Engine 112. The MultiStreamDecoder and DecoderGroup preferably include a list of streams playing in a menu and additional information for maintaining a state that allows synchronous playback of multiple streams on a display. FIG. 3 is a block diagram showing the various software classes of the multi-stream video decoder, including the MultistreamDecoder and DecoderGroup classes.

Overview of the Decoder Engine

The Decoder Engine 112 receives MPEG data (e.g., GOPs) and audio data from the Asset Manager 108 and transmits configuration data, Idealized Timestamp and frame sets to the Menu Renderer 104. For a DVD menu with six buttons, the Decoder Engine 112 receives six MPEG streams containing GOPs. If the menu background is a movie, the Decoder Engine 112 will receive seven MPEG streams. When playback is started it is expected that the motion in each of the six buttons will be played back in real time. However, due to hardware limitations the number of MPEG streams a given machine can decode completely in real time is limited. The present invention addresses this limitation by using controlled frame skipping, as described in detail below.

The output of the Decoder Engine 112 for a menu with six buttons is a sequence of frame sets (comprising six frames per set), for example, one frame for each button 204a . . . 204d of the menu shown in FIG. 2. Pixel data for each of those frames is passed back to the Menu Renderer 104 and the Rendering Engine 110, which together display the MPEG streams at their respective locations on the menu background on the playback display 202. The playback display 202 is triggered by a callback function that the Menu Renderer 104 registers with a MultiStreamDecoder object, which registers its callback function with the Decoder Engine 112. The callback function of the MultiStreamDecoder calls the callback function of the Menu Renderer 104. The Decoder Engine 112 determines the time of the callback and passes an Idealized Timestamp of the frame sets to the callback, as discussed more fully with respect to FIG. 4.

Decoding Process

Figure 4A:
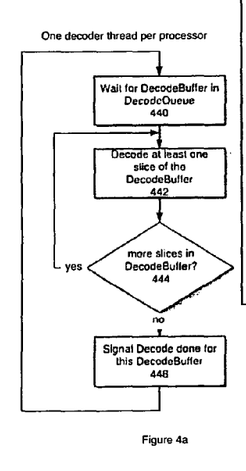
FIGS. 4a-4d are flow diagrams illustrating various process threads for the multi-stream decoder, in accordance with one embodiment of the present invention.
Figure 4B:
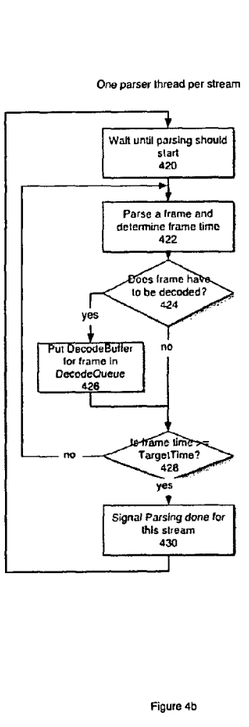
Figure 4C:
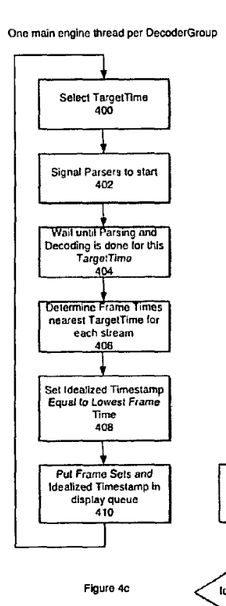
Figure 4D:
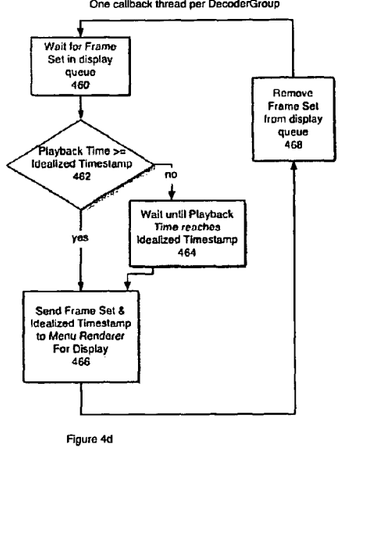

FIGS. 4a-4d are flow diagrams illustrating various process threads for the multi-stream decoder, in accordance with one embodiment of the present invention. More particularly, FIG. 4a is a flow diagram of a decoder thread, FIG. 4b is a flow diagram of a parser thread, FIG. 4c is a flow diagram of a main engine thread and FIG. 4d is a flow diagram of a callback thread.

Referring to FIG. 4c, the main engine thread (one per DecoderGroup) selects 400 a TargetTime for all streams in a DecoderGroup. The TargetTime can be initially set to zero but is computed using a time averaging scheme for subsequent iterations, which is described more fully below. After the TargetTime is selected 400, the parsers are signaled 402 to start. The thread then waits 404 until parsing and decoding of the streams is complete. Note that box 404 gets signaled by multiple occurrences of box 430 and box 446 shown in FIGS. 4b and 4a, respectively. To clarify, in order for box 404 to finish waiting, all streams of the DecoderGroup have to signal 430 parsing done and all DecodeBuffers of all streams for the DecoderGroup have to signal 446 decode done for the selected TargetTime. When the parsing and decoding is done, the frame time (i.e., the time when a particular frame should be displayed) nearest the selected TargetTime for each stream is determined 406. In one embodiment, an Idealized Timestamp is set 408 equal to the lowest frame time. The frame sets for the multiple streams and the Idealized Timestamp are put 410 in a data structure (hereinafter, also referred to as the Display Queue) and the main engine thread repeats. Each time the frame sets and the Idealized Timestamp are put 410 in the Display Queue a callback thread is signaled (invoked). The term "signaled" as used herein is known to those skilled in the art of multithreaded programming.

Referring to FIG. 4d, the callback thread (one per DecoderGroup) waits 460 for a frame set and Idealized Timestamp to be put 410 in the Display Queue. When a frame set and Idealized Timestamp are put 410 into the Display Queue, the Playback Time (i.e., a master clock for all streams) is compared 462 to the Idealized Timestamp. If 462 the Playback Time is greater than or equal to the Idealized Timestamp, then the frame set and Idealized Timestamp are sent 466 to the Menu Renderer 104 for display. If 462 the Playback Time is less the Idealized Timestamp, then the callback thread waits 464 until the Playback Time reaches the Idealized Timestamp before the frame set and Idealized Timstamp are sent 466 to the Menu Renderer 104 for display. In one embodiment, the Playback Time is CurrentTime( ) of the Timing Slave class shown in FIG. 3.

When the main engine thread signals 402 the parsers to start, one parser thread per stream is signaled (FIG. 4b). The parser threads wait 420 until the parsing should start, then parse 422 a frame and determine a frame time. If 424 the frame has to be decoded, a DecodeBuffer for the frame is put 426 in a Decoder Queue. If 424 the frame does not have to be decoded, then the frame time is immediately compared 428 against the TargetTime. If the frame time is greater than or equal to the TargetTime, then the parser thread signals 430 that the parsing is done. If the frame time is less than the TargetTime, then the thread returns to step 422.

When the parser thread puts 426 a DecodeBuffer for the frame in the DecodeQueue, then the decoder thread is signaled. The decoder thread waits 440 for the DecodeBuffer to be put 426 in DecodeQueue. When this occurs the decoder thread decodes 442 at least one slice of the DecodeBuffer. If 444 more slices are in the DecodeBuffer, then the decoder thread decodes 442 those slices as well. If 444 there are no more slices, then the decoder thread signals 446 decode done for the DecodeBuffer and the decoder thread repeats.

Thus, the process shown in FIGS. 4a-4d and described above, enables smooth and synchronous playback of multiple streams of encoded digital data, regardless of the structure of the video signals or the compression scheme used.

Because MPEG uses an interframe compression scheme, reference frames should be decoded before dependent frames are decoded. In one embodiment, at least three buffers are used to decode an MPEG-1 or MPEG-2 streams, because a B-frame that is currently being decoded into one buffer is dependent on a forward and a backward reference frame, which are stored in the other two buffers. The result of that dependency is that typically for every third frame at least two frames are decoded to display one frame. Moreover, for every third frame no frame needs to be decoded because it has been decoded as a reference frame before. Thus, to enable a host machine to be used 100% and not be sometimes idling (e.g., waiting for the Presentation Time of a frame that is already decoded), and to display a frame exactly when it is supposed to be displayed, the decoding and displaying (rendering) of frames are preferably separated and decoding is performed at least one frame ahead of displaying. If skipping is an expected behavior, e.g., in the case of more streams playing than a machine can handle at full frame rate, then the next frame to be decoded should be known before the current frame has finished displaying. Because displaying a frame can take considerable time, especially if the decoded pixels get manipulated by special effects before they are presented on the screen, the decoder 100 determines how long rendering will take to decide which frame to decode next. This determination can be made from experiments, observation and/or simulation.

TargetTime Calculation

In one embodiment, a next TargetTime is calculated by adding the average Playback Time it took to parse, decode and display the last N decoded frame sets to the time when the current frame set has completed decoding (hereinafter, also referred to as the "Decode End Time"). Thus, when a frame set completes decoding (i.e., the current TargetTime is reached), the current Playback Time is put in a data structure (e.g., a queue). The differences of the last N of the Playback Times associated with last N frame sets in the data structure are averaged. The next TargetTime is calculated by adding that average to the Decode End Time. When a TargetTime has been determined, the individual parsers use information (e.g., IPB frame patterns) gathered out of the stream to determine which frames to only parse and which frames to fully decode to ultimately decode the frame at or closest to the TargetTime. If the data structure is empty, then the duration between the decoding start and end times for the first frame for each stream can be used to initially fill the data structure so that the averaging technique described above can be used in the next TargetTime calculation.

The number of Playback Times stored in the data structure are preferably large enough to ensure that displaying of frames has occurred so that the display time is included in the averaging. Moreover, the number of Playback Times to be averaged should be large enough for the decoding time of audio to be included in a way that it is sufficiently averaged.

For example, at least the Playback Time differences for 3 frame sets are averaged out to compensate for BBP pattern irregularities (sometimes 2, sometimes 0 frames to be decoded to reach a certain frame time). Also, at least 5 video frames should be averaged out to eliminate a mix of (typical) inverse telecine material (3/2 pulldown) with native video (2 fields per frame always). Additionally, a minimum of max GOP size has to be averaged because I-frame, B-frame and P-frame decoding times will typically differ. In one embodiment, an average over 18 Playback Times are computed. A determining factor is the maximum DVD legal GOP size of 600 milliseconds, which at NTSC frame rate is equivalent to 18 frames. This covers the case of full frame rate playback for the maximum GOP size and all other factors. It also provides a good averaging if skipping of B-frames occurs and even in the I-frame only mode where the 18 Playback Times are up to 18*600 milliseconds (10.8 seconds) duration. When a TargetTime is determined, the MPEG Parsers for the individual streams continue. The B-frames that do not reach the TargetTime are dropped. If the average decoding time for a set goes above 400 milliseconds, a special mode is activated. In this mode the parsers will only put DecodeBuffers for I-frames in a decode queue. This mode ensures that up to a fairly large number of streams (e.g., around 30 streams) even on a minimum configuration motion with at least 1 frame per second can be presented. If the average decoding time falls below 200 milliseconds again, the special mode is deactivated again and the normal mode of operation (B-frame skipping) is resumed. Note that in I-frame only mode jitter can be up to a GOP size, but frame rate is usually better then one frame per 600 ms (1.6 frames per second). Both are not fully guaranteed though when the transition from B-frame skip to I-frame only happens.

Parsing, Decoding and Displaying

When a first stream is added to the Decoder Engine 112 a high priority thread is started by the operating system that controls the parsing and decoding of this and subsequent streams added to one or more DecoderGroups (see main engine thread shown in FIG. 4c). Also, one additional decoder thread per processor (two threads on a dual processor machine) can be started (see FIG. 4a). If additional hardware is used (e.g., VSP chips) additional decoder threads can be created and utilized as needed. In one embodiment of the present invention, when playback of a MultistreamDecoder is started two feeder threads are created, one to read an audio stream and the other to read multiple video streams from the MPEG assets that were set up in the Menu Renderer 104. The GOPs in the streams are fed into bit stream buffers for each stream. The Decoder Engine 112 starts an MPEG Parser (see FIG. 3) with a parser thread (FIG. 4b) for each of the video streams and waits for the data to arrive in these buffers. When there is enough data in the buffer to determine the horizontal and vertical size of each of the streams the Decoder Engine 112 calls the callback function that the MultistreamDecoder registered with the Menu Renderer 104 when creating the DecoderGroup, indicating that a configuration phase is complete and that decoding will begin. When this callback function returns, the Decoder Engine 112 generates further callbacks that inform the MultiStreamDecoder and, in turn, the Menu Renderer 104 to display frame sets that are stored in one or more memory locations provided to the Menu Renderer 104 via the callback function, as previously described with respect to FIG. 4.

Note that frame skipping relies on the ability to calculate the decoding time of a set of frames. This is true only when the main engine thread and the decoder threads are actually running most of the time. If other processes on the machine take over the processor or other threads are running in the application with higher priority, they may influence the calculation of TargetTime. In one embodiment, a simple averaging can be selected over a fairly long time period to ensure that the skipping mechanism is at least somewhat tolerant to these undesired effects.

Each MPEG video stream is a sequence of bits with a grammar that is defined by the publicly available MPEG specifications. The process of parsing means reading those bits and extracting values, such as the width, height frame rate, bit rate, and picture structure of the encoded frames from the bits. Display or rendering includes converting pixel data that the decoder put into one of its buffers to a format that can be uploaded to a graphics card and applying any additional special effects (e.g., simulating "old film"). Assuming that a decoding process is typically about 50 times more computing intensive then a parsing process, and further assuming that rendering is significantly cheaper then decoding, the decoding process can be distributed among one or more processors in a computer system. In multi-processor computer systems, the decoding process can be performed by one or more threads, preferably one thread per processor to reduce operating system overhead. In one embodiment, the parsing of video, parsing/decoding of audio and the display are handled in threads, which are controlled by a "main engine" thread.

In one embodiment, the main engine thread controls various tasks in priority of importance. Generally, a thread becomes active: 1) if there is room in the PCM buffer for audio and audio bit stream input data is available, and audio is decoded into the PCM buffer, 2) if there is a set of frames pending for display and the call back function is called so frames are passed to the Menu Renderer 104, 3) if there is a stream that has not reached a TargetTime, and it has a free buffer, parse a frame for that stream, and 4) if none of these activities can be done, grab a slice (or a group of slices) from the decode queue and decode it, while there are no higher priority activities. Note that the first two of these activities are preferably quicker than the time needed to decode the slice information that is in the decode queue. If they are not, then at those times decoding in the decoder thread may stall and performance will be suboptimal.

By using one TargetTime for all streams, synchronous playback of MPEG video streams can be achieved. The parser threads of all streams controlled by the main engine thread put slice information of needed frames in a decode queue or equivalent structure until they reach the TargetTime. The data structure containing the slice information necessary for decoding is called a DecodeBuffer, which preferably is a structure containing various bits of information for the decoders and only pointers to the MPEG slice data in the bit stream buffer. The decoder thread runs as soon as the first DecodeBuffer is in the decode queue. As long as the host machine can handle all streams at full frame rate, jitter will only occur when the streams playing have inverse telecine patterns or substantially different frame rates since a base rendering frame rate of either standard NTSC or PAL rate is assumed until skipping occurs. When skipping is necessary, jitter and frame rate are determined by the skipping logic.

Audio and Sync

In addition to smooth video playback, another objective of the present invention is to maintain uninterrupted audio playback. Fortunately, modern audio codecs have a fairly constant complexity over the duration of a stream and the amount of processing power required for decoding is typically much less then that required for video. Thus, even if it is not constant, the variation has only a small effect on the determination of which next frame to handle. A typical audio playback includes decoding and rendering. During rendering a stream of bytes in a given format (e.g., 48 kHz stereo PCM data) are passed to Audio Out 114 (e.g., CoreAudio software layer), which communicates with audio hardware. While the operating system provides the thread requesting audio data from the authoring tool a higher priority than other threads, it is responsibility of the decoder to have data ready for delivery. As typical DVD audio formats are not PCM encoded (e.g., AC-3, MPEG-1 layer 2) or because media files that are typically imported through QuickTime™ are not PCM files (e.g., AAC, MP3), the preparation of the PCM is preferably a higher priority then the video decoding process. Thus, at the time the previously described timer starts, a first block of PCM data can be returned to an audio thread to facilitate smooth, uninterrupted audio that is in sync with at least one video stream.

Other Embodiments

Various speed improvements can be made to the decoding process, including but not limited to improved memory layout, use of additional decoders (e.g., Magma, ATI, NVidia decoders), each working in additional decoder threads for one or more streams. One improvement to the logic is the addition of field rate rendering to avoid the jitter of inverse telecine material. This could be combined with deinterlacing to improve the rendering quality of standard video material, as the output of the deinterlacing process is also at field rate.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A decoder for synchronous playback of multiple independent streams of encoded digital data, comprising:
   a plurality of parsers configured to parse the multiple independent streams of encoded digital data into a plurality of parsed frames of encoded digital data and determine a plurality of frame times, associated with corresponding parsed frames;
   a plurality of decoders configured to decode the parsed frames of encoded digital data based on information provided by the parsers; and
   a decoder engine configured to determine a next target time value for the plurality of decoders to complete their respective decoding processes prior to their display,
   wherein the decoder engine determines, during a pause of the parsers after a current target time value is reached, the next target time value from the current target time value and previous playback times of the multiple independent streams,
   the decoder engine compares the next target time value and each frame time of the plurality of the parsed frames to determine whether the frame time of each parsed frame reaches the next target time value,
   if the frame time of each parsed frame does not reach the next target time value, the decoder engine skips decoding of the corresponding parsed frame,
   if the frame time of each parsed frame reaches the next target time value, the decoder engine transfers the corresponding parsed frame to the plurality of decoders to be decoded, and
   when the decoders complete decoding the transferred frames, the decoder engine determines a frame time for displaying a frame nearest to the next target time value in each one of the multiple independent streams.

2. The decoder of claim 1, wherein parsing by the parsers is resumed after the next target time is determined.

3. The decoder of claim 1, wherein parsing and decoding are performed by parsing and decoding threads, respectively, and the parsing threads are processed before the decoding threads.

4. The decoder of claim 1, wherein the number of decoders is equal to the number of processors in the system.

5. The decoder of claim 1, wherein determining the next target time value from previous playback times comprises averaging the previous playback times to generate an average previous playback times.

6. The decoder of claim 5, wherein determining the next target time value from previous playback times further comprises adding the average previous playback times to the current target time value.

7. A computer-implemented method of providing synchronous playback of multiple independent streams of encoded digital data on a display screen, comprising:
   parsing, by a processor, the multiple independent streams of encoded digital data into a plurality of parsed frames of encoded digital data using a plurality of parsers;
   determining a plurality of frame times, associated with corresponding parsed frames;
   decoding the parsed frames of encoded digital data based on information provided by the parsers; and
   determining a next target time value using a decoder engine for the plurality of decoders to complete their respective decoding processes prior to their display,
   wherein the decoder engine determines, during a pause of the parsers after a current target time value is reached, the next target time value from the current target time value and previous playback times of the multiple independent streams,
   the decoder engine compares the next target time value and each frame time of the plurality of the parsed frames to determine whether the frame time of each parsed frame reaches the next target time value,
   if the frame time of each parsed frame does not reach the next target time value, the decoder engine skips decoding of the corresponding parsed frame,
   if the frame time of each parsed frame reaches the next target time value, the decoder engine transfers the corresponding parsed frame to the plurality of decoders to be decoded, and
   when the decoders complete decoding the transferred frames, the decoder engine determines a frame time for displaying a frame nearest to the next target time value in each one of the multiple independent streams.

8. The method of claim 7, further including resuming parsing by the parsers after the next target time is determined.

9. The method of claim 7, further including performing parsing and decoding using parsing and decoding threads, respectively, and processing the parsing threads before the decoding threads.

10. The method of claim 7, further including averaging the previous playback times to generate an average previous playback times for determining the next target time value.

11. The method of claim 10, further including adding the average previous playback times to the current target time value for determining the next target time value.

12. A non-transitory computer-readable medium having stored thereon instructions, which, when executed by a processor, cause the processor to perform the operations of:
   parsing the multiple independent streams of encoded digital data into a plurality of parsed frames of encoded digital data using a plurality of parsers;
   determining a plurality of frame times, associated with corresponding parsed frames;
   decoding the parsed frames of encoded digital data based on information provided by the parsers; and
   determining a next target time value using a decoder engine for the plurality of decoders to complete their respective decoding processes prior to their display,
   wherein the decoder engine determines, during a pause of the parsers after a current target time value is reached, the next target time value from the current target time value and previous playback times of the multiple independent streams, the decoder engine compares the next target time value and each frame time of the plurality of the parsed frames to determine whether the frame time of each parsed frame reaches the next target time value, if the frame time of each parsed frame does not reach the next target time value, the decoder engine skips decoding of the corresponding parsed frame, if the frame time of each parsed frame reaches the next target time value, the decoder engine transfers the corresponding parsed frame to the plurality of decoders to be decoded, and when the decoders complete decoding the transferred frames, the decoder engine determines a frame time for displaying a frame nearest to the next target time value in each one of the multiple independent streams.

13. A computer-implemented method of providing synchronous playback of multiple independent streams of encoded digital data on a display screen, comprising:

storing state information of the multiple independent streams of encoded digital data, the state information of a stream of encoded digital data identifying structures specific to the stream;

decoding the multiple streams of encoded digital data;

determining, by a processor, a frame time for each stream of the multiple streams of encoded digital data based on the state information associated with the stream, the frame time of a stream of the multiple streams of encoded digital data representing the time when the stream is to be displayed;

determining a next target time value using a decoder engine for a plurality of decoders to complete their respective decoding processes prior to their display, wherein the decoder engine determines, during a pause of parsers after a current target time value is reached, the next target time value from the current target time value and previous playback times of the multiple independent streams, the decoder engine compares the next target time value and each frame time of the plurality of the parsed frames to determine whether the frame time of each parsed frame reaches the next target time value, if the frame time of each parsed frame does not reach the next target time value, the decoder engine skips decoding of the corresponding parsed frame, if the frame time of each parsed frame reaches the next target time value, the decoder engine transfers the corresponding parsed frame to the plurality of decoders to be decoded, and when the decoders complete decoding the transferred frames, the decoder engine determines a frame time for displaying a frame nearest to the next target time value in each one of the multiple independent streams;

selecting an idealized timestamp for the multiple streams of encoded digital data based on the frame times of the multiple streams of encoded digital data; and displaying the multiple streams of encoded digital data based on a comparison between the selected idealized timestamp and a playback timestamp.

14. The method of claim 13, wherein the idealized timestamp is the lowest frame time of the frame times associated with the multiple streams of encoded digital data.

15. The method of claim 13, further comprising storing grouping information of the multiple streams of encoded digital data, the grouping information identifying two or more of the multiple streams of encoded digital data that are played back simultaneously base on one or more attributes common to the identified streams of encoded digital data.

16. The method of claim 13, wherein the playback timestamp is a master clock time for the multiple streams of encoded digital data.

17. The method of claim 13, wherein displaying the multiple streams of encoded digital data comprises:

responsive to the playback timestamp being greater than or equal to the idealized timestamp, displaying the multiple streams of encoded digital data.

18. The method of claim 13, wherein the multiple streams of encoded digital data comprise at least one audio stream.

19. The method of claim 13, further comprising maintaining uninterrupted audio playback.

20. A computer method for multi-stream synchronous playback of a DVD menu on a display screen, comprising:

rendering a user interface for arranging multiple independent video streams in a menu format;

providing textures and overlays to a video output for displaying the menu;

storing structure information of the multiple video streams and decoding the multiple independent video streams synchronously by a plurality of video decoders using controlled frame skipping;

determining, by a processor, a next target time value using a decoder engine for the plurality of video decoders to complete their respective decoding processes prior to their display, wherein the decoder engine determines, during a pause of parsers after a current target time value is reached, the next target time value from the current target time value and previous playback times of the multiple independent video streams, the decoder engine compares the next target time value and each frame time of the plurality of the parsed frames to determine whether the frame time of each parsed frame reaches the next target time value, if the frame time of each parsed frame does not reach the next target time value, the decoder engine skips decoding of the corresponding parsed frame, if the frame time of each parsed frame reaches the next target time value, the decoder engine transfers the corresponding parsed frame to the plurality of video decoders to be decoded, and when the video decoders complete decoding the transferred frames, the decoder engine determines a frame time for displaying a frame nearest to the next target time value in each one of the multiple independent video streams.

21. The method of claim 20, wherein the information of structure of a video stream of the multiple video streams comprises: a number of groups of pictures (GOPs) contained in the video stream; boundaries of the GOPs contained in the video stream; and relative time associated with a GOP contained in the video stream for playback.

22. The method of claim 20, wherein decoding the multiple video streams synchronously further comprises:

receiving GOPs of video data and audio data from an asset manager;

determining an idealized timestamp of the multiple video streams; and transmitting decoding configuration data, the idealized timestamp and frame sets of the multiple video streams to a menu renderer.

23. The method of claim 20, further comprising: storing audio information associated with the multiple video streams.

* * * * *